United States Patent
Dalwadi et al.

(10) Patent No.: US 10,355,587 B2
(45) Date of Patent: Jul. 16, 2019

(54) ELECTRONIC DEVICE AND METHOD OF MANUFACTURING THE SAME

(71) Applicant: NXP B.V., Eindhoven (NL)

(72) Inventors: Jaydeep Dalwadi, Vadodara (IN); Venkata Satya Sai Evani, Bangalore (IN)

(73) Assignee: NXP B.V., Eindhoven (NL)

(*) Notice: Subject to any disclaimer, the term of this patent is extended or adjusted under 35 U.S.C. 154(b) by 511 days.

(21) Appl. No.: 14/630,606

(22) Filed: Feb. 24, 2015

(65) Prior Publication Data

US 2015/0244257 A1  Aug. 27, 2015

(30) Foreign Application Priority Data

Feb. 24, 2014  (EP) .................... 14156424

(51) Int. Cl.
  *H02M 3/04*  (2006.01)
  *H02M 1/14*  (2006.01)
  *H02M 3/07*  (2006.01)
  *H02M 1/00*  (2006.01)

(52) U.S. Cl.
  CPC ............ *H02M 3/04* (2013.01); *H02M 1/00* (2013.01); *H02M 1/14* (2013.01); *H02M 3/07* (2013.01); *Y10T 29/49117* (2015.01)

(58) Field of Classification Search
  CPC ............ H02M 1/00; H02M 1/14; H02M 3/04; H02M 3/07; H02M 2001/0045; Y10T 29/49117; Y10T 29/0045; H04W 4/80; H04M 2250/04; H04N 2201/006; H04L 63/0492
  See application file for complete search history.

(56) References Cited

U.S. PATENT DOCUMENTS

| | | |
|---|---|---|
| 6,316,922 B1 | 11/2001 | Sugahara et al. |
| 6,411,531 B1 | 6/2002 | Nork et al. |
| 6,661,683 B2 | 12/2003 | Botker et al. |

(Continued)

FOREIGN PATENT DOCUMENTS

| | | |
|---|---|---|
| EP | 1067658 A2 | 10/2001 |
| EP | 2 385 615 A1 | 11/2011 |

OTHER PUBLICATIONS

Federal Communications Commission (FCC) "Consumer Guide: Interference with Radio, TV and Telephone Signals" Last Reviewed Nov. 6, 2015.*

(Continued)

*Primary Examiner* — Nguyen Tran
*Assistant Examiner* — Demetries A Gibson

(57) ABSTRACT

There is described an electronic device, the device comprising (a) a power supply terminal for connecting to a power supply (130, 330), (b) a first circuit (110, 310) coupled to be powered by the power supply, the first circuit (110, 310) being susceptible to power supply noise within a predetermined frequency range, and (c) a second circuit (120, 320) coupled to be powered by the power supply, the second circuit (120, 320) comprising an open-loop capacitive DC-DC converter (323) having a switching frequency outside of the predetermined frequency range. There is also described a system comprising an electronic device and a reader/writer device. Furthermore, there is described a method of manufacturing an electronic device.

19 Claims, 3 Drawing Sheets

(56) References Cited

U.S. PATENT DOCUMENTS

| | | | | |
|---|---|---|---|---|
| 7,863,952 B2* | 1/2011 | Friedman | | H03L 7/1976 |
| | | | | 327/150 |
| 8,629,935 B2* | 1/2014 | Kikuchi | | H04N 5/23241 |
| | | | | 348/241 |
| 9,419,516 B2* | 8/2016 | Philip | | H02M 3/07 |
| 2005/0040885 A1* | 2/2005 | Hayashi | | G05F 3/30 |
| | | | | 327/543 |
| 2008/0150620 A1* | 6/2008 | Lesso | | H02M 3/07 |
| | | | | 327/536 |
| 2008/0224769 A1* | 9/2008 | Markowski | | H03F 1/0227 |
| | | | | 330/10 |
| 2009/0072800 A1* | 3/2009 | Ramadass | | H02M 3/07 |
| | | | | 323/271 |
| 2012/0049903 A1 | 3/2012 | Oh et al. | | |
| 2012/0274394 A1* | 11/2012 | Chan | | G05F 1/625 |
| | | | | 327/536 |
| 2013/0009696 A1* | 1/2013 | Brown | | H02M 3/07 |
| | | | | 327/536 |
| 2013/0194031 A1* | 8/2013 | Poulton | | H04L 25/0272 |
| | | | | 327/536 |
| 2013/0195291 A1* | 8/2013 | Josefsson | | H02M 1/12 |
| | | | | 381/174 |
| 2014/0055197 A1* | 2/2014 | Khlat | | H03F 3/45663 |
| | | | | 330/127 |
| 2014/0141844 A1* | 5/2014 | Golla | | H04W 52/0296 |
| | | | | 455/572 |
| 2014/0281383 A1* | 9/2014 | Dally | | G06F 15/7864 |
| | | | | 712/42 |
| 2014/0344589 A1* | 11/2014 | Muthukaruppan | | H02M 3/07 |
| | | | | 713/300 |
| 2015/0002195 A1* | 1/2015 | Englekirk | | H03L 7/0891 |
| | | | | 327/157 |
| 2015/0008755 A1* | 1/2015 | Sone | | H02J 5/005 |
| | | | | 307/104 |
| 2015/0162754 A1* | 6/2015 | Nakano | | H02J 5/005 |
| | | | | 307/104 |
| 2018/0351370 A1* | 12/2018 | Ichikawa | | H02J 50/80 |

OTHER PUBLICATIONS

Extended European Search Report for Patent Appln. No. 14156424.5 (dated Jul. 4, 2014).

\* cited by examiner

ELECTRONIC DEVICE AND METHOD OF MANUFACTURING THE SAME

CROSS-REFERENCE TO RELATED APPLICATIONS

This application claims the priority under 35 U.S.C. § 119 of European patent application no. 14156424.5, filed on Feb. 24, 2014, the contents of which are incorporated by reference herein.

FIELD OF THE INVENTION

The present invention relates to the field of electronic devices, in particular to integrated electronic devices comprising multiple circuits and a common power supply.

ART BACKGROUND

Several integrated electronic devices exist, in which two or more circuits are built on a single chip and supplied by a single, i.e. common power supply. In some cases, ripple (or other input noise) caused by one of the circuits may have a negative impact on the operation of another circuit. This problem occurs e.g. when an NFC contactless frontend is implemented on the same chip as a contact-card frontend and both frontends are to be supplied by a single battery. More specifically, a contact-card frontend usually includes a capacitive boost DC-DC converter (e.g. a voltage doubler) for regulating the supply voltage according to the requirements of the contact-card frontend. As the switching frequency of such a capacitive boost DC-DC converter is directly proportional to the load current, the switching may generate ripple within a frequency that is problematic for the contactless front end and may even cause the latter to malfunction. Other examples may involve an audio processing circuit which may be negatively influenced by input noise or ripple caused by a DC-DC converter supply varying load within the audible frequency range.

Attempts towards solving the above problems have been made, including reducing ripple by adding additional resistances in the input of the DC-DC voltage doubler with feedback loop. However, such techniques require a huge area for additional series switches, and moreover, they require sensing of the load current. This also introduces control loop delay in the system. In such a scenario, during this delay if the RF frontend is ON, then there are chances of high magnitude ripple disturbing the RF frontend operation.

There may thus be a need for a simple and efficient way of overcoming the above drawbacks.

SUMMARY OF THE INVENTION

This need may be met by the subject matter according to the independent claims. Advantageous embodiments of the present invention are set forth in the dependent claims.

According to a first aspect there is provided an electronic device, the device comprising (a) a power supply terminal for connecting to a power supply, (b) a first circuit coupled to be powered by the power supply, the first circuit being susceptible to power supply noise within a predetermined frequency range, and (c) a second circuit coupled to be powered by the power supply, the second circuit comprising an open-loop capacitive DC-DC converter having a switching frequency outside of the predetermined frequency range.

This aspect is based on the idea that the amount of power supply noise within a predetermined frequency range to which the first circuit is susceptible, can be significantly reduced by implementing an open-loop capacitive DC-DC converter in the second circuit, the open-loop capacitive DC-DC converter having a switching frequency outside of the predetermined frequency range. The switching frequency of the open-loop capacitive DC-DC converter is fixed and independent of the load current and does therefore not cause power supply noise, such as ripple, within the predetermined frequency range.

In the present context, the term "the first circuit being susceptible to power supply noise within a predetermined frequency range" may particularly denote that the operation of the first circuit may suffer severe impact or even be impossible in case of power supply noise occurring within the predetermined frequency range. In other words, the "predetermined frequency range" may be considered as a critical frequency range for the first circuit in the sense that noise within this frequency range may be problematic for the first circuit.

In the present context, the term "open-loop capacitive DC-DC converter" may in particular denote a DC-DC converter relying on a capacitor to double an input voltage at a fixed switching frequency without a feedback loop or other regulation system.

According to an embodiment, the second circuit further comprises a first low-dropout regulator coupled between the power supply terminal and an input of the open-loop capacitive DC-DC converter.

By arranging the first low-dropout regulator (LDO) between the power supply terminal and the input of the open-loop capacitive DC-DC converter, the input voltage of the open-loop capacitive DC-DC converter is stabilized and relatively robust to changes in the voltage provided at the power supply terminal. Thereby, the open-loop capacitive DC-DC converter is assisted in providing a stable output voltage even without a feedback loop.

According to a further embodiment, the second circuit further comprises a second low-dropout regulator coupled to an output of the open-loop capacitive DC-DC converter.

By adding a second LDO at the output of the open-loop capacitive DC-DC converter, a very stable voltage may be provided.

According to a further embodiment, the second circuit comprises a contact communication interface.

The contact communication interface enables data communication with another device via an electric connection established between corresponding contact terminals of the devices. The other device may e.g. be a "contact card" compliant to ISO 7816 standard or EMVCo or NDS standards.

According to a further embodiment, the second low-dropout regulator is coupled to provide the contact communication interface with a predetermined supply voltage.

The predetermined supply voltage may depend on the specific type of contact communication interface. For a Class A contact communication interface, the predetermined supply voltage may be 5V, for a Class B contact communication interface, the predetermined supply voltage may be 3V, and for a Class C contact communication interface, the predetermined supply voltage may be 1.8V.

According to a further embodiment, the first circuit comprises a contactless communication interface.

The contactless communication interface enables data communication with another device via a wireless RF (Radio Frequency) connection, such as an NFC (Near Field Communication) connection. The other device may e.g. be a proximity coupling device (PCD), i.e. a reader/writer device or another NFC interface, such as a proximity integrated circuit card (PICC) or card installed in some other device, such as a mobile telephone. In other words, the electronic device may communicate with an NFC card as well as performing peer-to-peer communication with another (similar) device.

According to a further embodiment, the first circuit comprises a low-dropout regulator coupled to the power supply terminal to provide a regulated voltage to the contactless communication interface.

The LDO operates in by-pass mode or as a bypass switch when the difference between the input voltage provided to the LDO from the power supply terminal and the expected regulated output voltage of the LDO is insignificant, i.e. below 0.5V. In this mode of operation, the LDO provides no power supply rejection. Hence, any switching noise caused by the second circuit would pass through the LDO and potentially cause a negative influence on the operation of the first circuit. However, as the possible switching noise of the second circuit falls outside of the critical frequency band of the first circuit, the operation of the first circuit will not be disturbed, at least not significantly.

According to a further embodiment, the predetermined frequency range is 100 kHz to 1 MHz, such as 150 kHz to 900 kHz, such as 200 kHz to 800 kHz, such as 300 kHz to 700 kHz, such as 400 kHz to 600 kHz, such as around 500 kHz.

In particular when the first circuit comprises an NFC communication interface, operation of the first circuit will not be significantly disturbed by switching noise outside of the frequency range from about 100 kHz to about 1 MHz.

According to a further embodiment, the switching frequency of the open-loop capacitive DC-DC converter is larger than 1 MHz.

In particular when the first circuit comprises an NFC communication interface, operation of the first circuit will not be significantly disturbed by switching noise generated by the open-loop capacitive DC-DC when the latter uses a switching frequency larger than about 1 MHz.

According to a second aspect, there is provided an electronic communication system, the system comprising (a) an electronic device according to the first aspect or any of the above embodiments, and (b) at least one reader/writer device adapted to perform contact and/or contactless communication with the electronic device.

The reader/writer device may be a stationary device, such as a device for performing payment transactions at a store or a device for checking the validity of an electronic ticket for public transportation. Alternatively, the reader/writer device may be a mobile device, such as a mobile terminal for performing payment transactions or a mobile communication device, such as a mobile phone.

According to a third aspect, there is provided a method of manufacturing an electronic device, the method comprising (a) providing a power supply terminal for connecting to a power supply, (b) providing a first circuit coupled to be powered by the power supply, the first circuit being susceptible to power supply noise within a predetermined frequency range, and (c) providing a second circuit coupled to be powered by the power supply, the second circuit comprising an open-loop capacitive DC-DC converter having a switching frequency outside of the predetermined frequency range.

This aspect provides a method of manufacturing an electronic device according to the first aspect or any of the above embodiments.

It should be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless otherwise indicated, in addition to any combination of features belonging to one type of subject matter also any combination of features relating to different subject matters, in particular a combination of features of the method type claims and features of the apparatus type claims, is also disclosed with this document.

The aspects defined above and further aspects of the present invention will be apparent from the examples of embodiment to be described hereinafter and are explained with reference to the examples of embodiment. The invention will be described in more detail hereinafter with reference to examples of embodiment to which the invention is, however, not limited.

DETAILED DESCRIPTION

Figure 1:
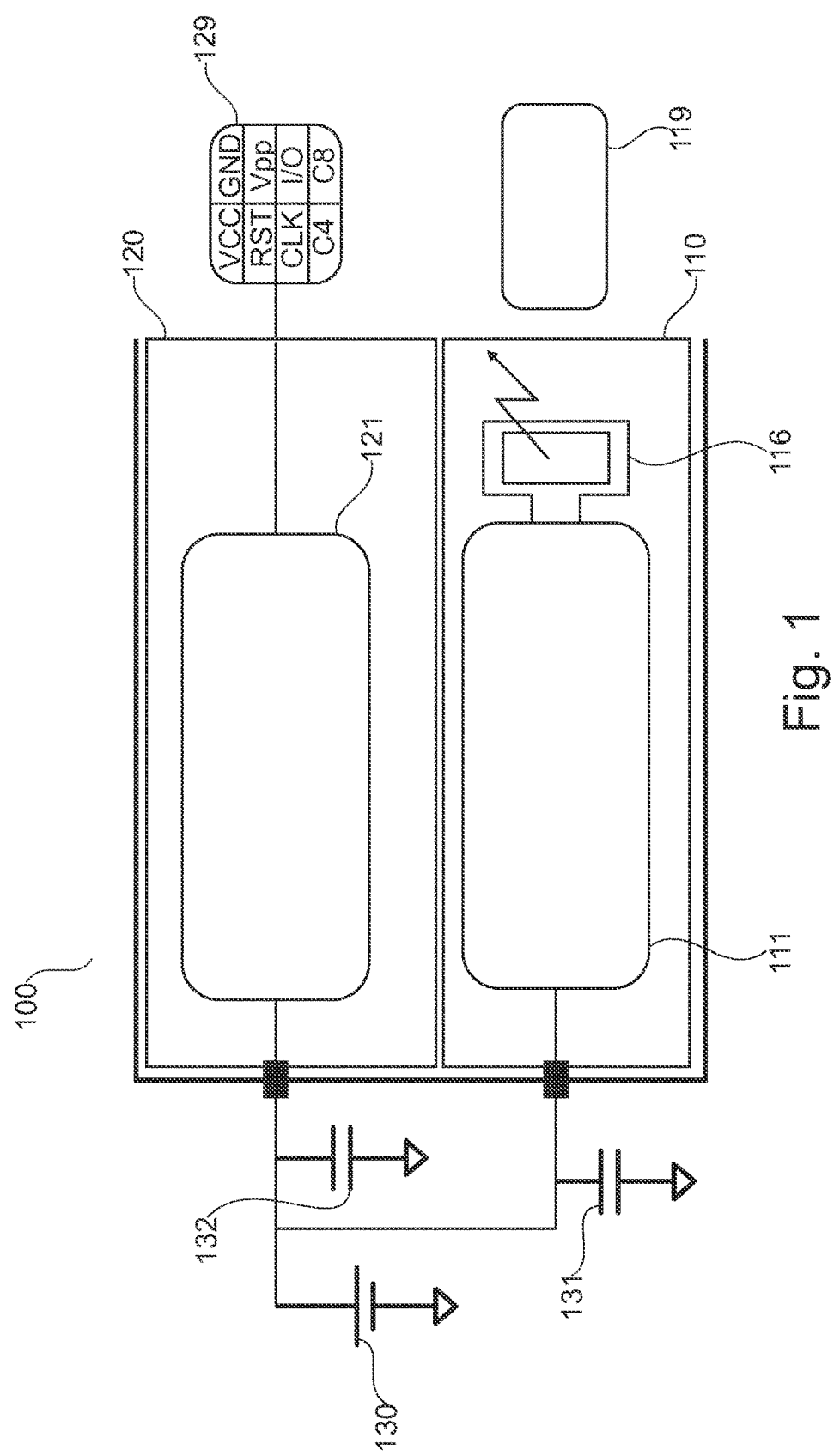
FIG. 1 is a block diagram showing the general structure of an electronic device in accordance with an embodiment.

The illustration in the drawing is schematic. It is noted that in different figures, similar or identical elements are provided with the same reference signs or with reference signs, which differ only within the first digit.

FIG. 1 is a block diagram showing the general structure of an electronic device 100 in accordance with an embodiment. More specifically, the electronic device 100 comprises a first circuit 110 and a second circuit 120 on a single chip. The first circuit 110 comprises an NFC contactless frontend 111 and antenna 116 for communicating with an NFC contactless card 119. The second circuit 120 comprises a contact frontend 121 for communicating with a contact card 129. Both the first circuit 110 and the second circuit 120 are connected to a common power supply 130, such as a battery or any other type of power supply and have respective input decoupling capacitances 131 and 132. To assure correct operation of the circuits 110 and 120, some kind of voltage regulator has to be utilized to provide a useful supply voltage based on the voltage supplied by the battery 130. To this end, capacitive DC-DC converters are key elements of today's ICs as they provide low footprint solutions with higher efficiency. The basic principle of capacitive DC-DC converters is based on charge transfer from input supply to the output decoupling capacitance. However, as explained further below, the switching occurring in such capacitive DC-DC converters may cause problematic noise.

Figure 2:
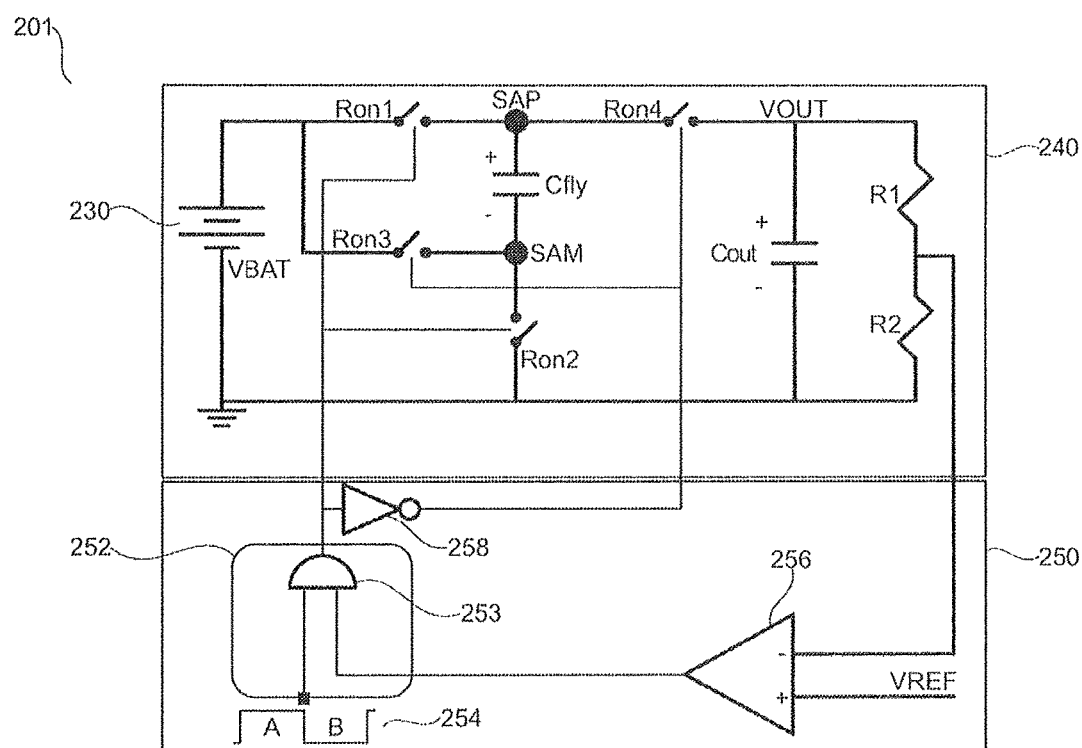
FIG. 2 shows an exemplary closed-loop capacitive boost DC-DC converter.

FIG. 2 shows an exemplary closed-loop capacitive boost DC-DC converter 201. More specifically, FIG. 2 shows a conventional DC-DC-converter 201 with feedback loop with clock gating implementation. The DC-DC converter 201 comprises a voltage doubler 240 connected to power supply 230, and a feedback and control loop 250. The voltage doubler 240 comprises controllable switches Ron1, Ron2, Ron3, and Ron4, capacitors Cfly and Cout, and resistors R1 and R2, which form a voltage divider. The feedback and control loop 250 comprises a control block 252 comprising an AND gate receiving a clock signal 254 with a 50% duty cycle on one input. The feedback and control loop 250 further comprises a comparator 256 connected to voltage divider R1, R2 and a reference voltage VREF. The output of comparator 256 is connected to the other input of AND gate 253. The output signal from the control block 252 is applied as a control signal to the switches Ron1 and Ron 2 of the voltage doubler 240. The output signal from the control block 252 is further supplied to an inverter 258 and the output signal from the inverter 258, i.e. the inverted output signal from the control block 252, is applied as a control signal to the switches Ron3 and Ron4.

In operation, the architecture 201 shown in FIG. 2 uses the voltage doubler 240 and feedback control loop 250 to provide a boosted and regulated output voltage VOUT. More specifically, in phase A of the clock signal 254, the switches Ron1 and Ron2 are ON (i.e. closed) while Ron3 and Ron4 are OFF (i.e. open). Thereby, during phase A of the clock signal 254, the capacitor Cfly is charged to the voltage VBAT of battery 230. Then, in phase B of the clock signal 254, the switches are all switched, i.e. Ron1 and Ron2 are now OFF and switches Ron3 and Ron4 are ON. Thereby, the bottom plate of the capacitor Cfly is connected to the positive terminal of battery 230, i.e. to the voltage VBAT, whereas the top plate of the capacitor Cfly is connected to VOUT, which is also connected to the top plate of the capacitor Cout. Accordingly, on the onset of phase B of clock signal 254, the voltage at terminal SAP bounces to 2*VBAT and the capacitor Cfly discharges to the capacitor Cout.

The feedback and control loop 250 performs the function of regulating the boosted output voltage. More specifically, this control loop 250 varies the switching frequency of the DC-DC converter with load current in-order to provide the regulated output voltage. That is, the control signals provided to the switches Ron1, Ron2, Ron3, and Ron4 are modified in accordance with the output from comparator 256.

Batteries have their own internal resistance. Due to this and the switching activity in the DC-DC loop (which is proportional to load current), a ripple with the same frequency as the switching frequency is generated on the VBAT supply 230. More specifically, the output voltage VOUT can be written as:

$$VOUT = \left(2*VBAT - Iload*\left(\left(\frac{1}{Fs*Cfly}\right) + (8*Ron)\right)\right)$$

Where:
Iload=Load current of DC-DC,
Fs=Switching frequency of DC-DC,
Cfly=Fly capacitance of DC-DC,
Ron=Ron1=Ron2=Ron3=Ron4=Switch resistance of DC-DC,
VBAT=Input voltage of the DC-DC, and
VOUT=Output voltage of the DC-DC.

The above equation shows that for higher load current, the switching frequency will be higher, and for lower load current, the switching frequency will be lower. Furthermore, the equations also points to the fact that if Fs is fixed, then as Iload increases the VOUT will vary from a minimum value $VOUT_{min}=2*VBAT-Iload*8*Ron$ (under loaded condition) to a maximum value $VOUT_{max}=2*VBAT$ for Iload=0.

As can be seen from the above, if a closed-loop capacitive boost DC-DC converter 201 as shown in FIG. 2 is used in the second circuit 120 of FIG. 1 to boost the battery voltage, e.g. 2.7V, to a supply voltage of 3V for a Class B contact card, then considerable switching noise will be introduced on the supply pin of the chip. The NFC critical frequency band is 100 KHz to 1 MHz. Hence, any switching noise generated by the DC-DC converter 201 within this frequency range will be disastrous for the functionality of the NFC contactless frontend 111.

Figure 3:
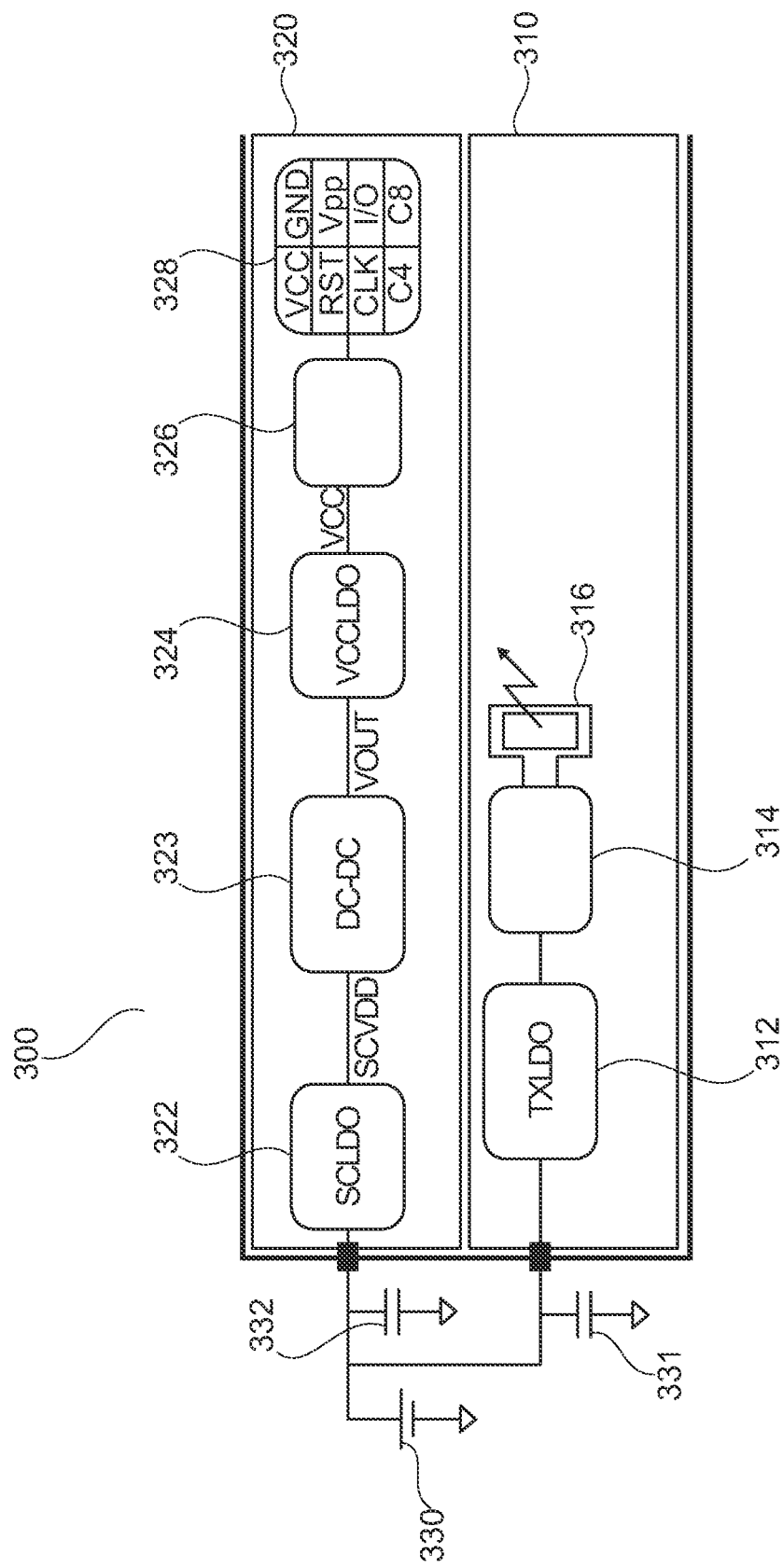
FIG. 3 shows a block diagram of an electronic device in accordance with an embodiment.

FIG. 3 shows a block diagram of an electronic device 300 in accordance with an embodiment. More specifically, the electronic device 300 comprises a first circuit 310 and a second circuit 320 on a single chip. The first circuit 310 comprises a low-dropout regulator (TXLDO) 312, an NFC contactless interface 314 and an antenna 316 for communicating with an NFC contactless card (not shown). The input of TXLDO 312 is connected to common power supply 330, e.g. a 3V battery, over the input capacitance 331 of the first circuit 310. The second circuit 320 comprises a first low-dropout regulator (SCLDO) 322, an open-loop capacitive DC-DC converter 323, a second low-dropout regulator (VC-CLDO) 324, a contact interface 326, and a set of terminals 328 for connecting to a contact card (not shown). The input of SCLDO 322 is connected to the common power supply 330 over the input capacitance 332 of the second circuit 320 and provides a regulated voltage SCVDD as an input to the open-loop capacitive DC-DC converter 323. The DC-DC converter 323 provides a voltage VOUT, e.g. in the range 4.8V to 4.3V as an input to VCCLDO 324, which provides the contact interface 326 with a stable supply voltage VCC, e.g. 3V. The contact interface 326 is connected with the set of terminals 328 in order to communication with an external contact card.

The open-loop capacitive DC-DC converter 323 essentially corresponds to the converter 201 shown in FIG. 2 without the feedback loop provided by comparator 256 and AND gate 253. Accordingly, the switching frequency of the open-loop capacitive DC-DC converter 323 is constant, i.e. equal to the frequency of the clock signal corresponding to 254 in FIG. 2. This frequency is preferably larger than 1 MHz, such as larger than 1.1 MHz, such as larger than 1.2 MHz, such as larger than 1.5 MHz, such as larger than 2 MHz. Thereby, ripple caused by the switching in DC-DC converter 323 is outside of the critical range of the NFC contactless interface 314. Furthermore, the amount (i.e. amplitude) of ripple is significantly reduced in comparison to the DC-DC converter 201 of FIG. 2 due to the inclusion of the first LDO, i.e. SCLDO 322, which provides a well regulated input voltage to DC-DC converter 323.

The present invention is generally applicable to devices comprising an NFC contactless frontend and Contact-card frontend on a single chip, wherein both communication channels are supplied from a single battery with battery voltage as low as 2.3V. Even lower power supply voltages (battery voltages) may be implemented by using DC-DC Tripler configurations in place of DC-DC converter 323.

Generally, there are 3 different classes for contact-cards, i.e. Class C cards with a supply voltage of 1.8V, Class B cards with a supply voltage of 3V, and Class A cards with a supply voltage of 5V. The technology trend seems to point to a hugely increased use of in particular Class B and Class C cards. As discussed above, in particular in conjunction with FIG. 3, the present invention is capable of supplying a Class B card with 3V from a 2.3V utilizing a DC-DC converter 323 to boost the supply voltage without, however, causing switching noise, in particular ripple, within the critical frequency range of an NFC contactless frontend residing on the same chip and power by the same battery.

It is noted that, unless otherwise indicated, the use of terms such as "upper", "lower", "left", and "right" refers solely to the orientation of the corresponding drawing.

It is noted that the term "comprising" does not exclude other elements or steps and that the use of the articles "a" or "an" does not exclude a plurality. Also elements described in association with different embodiments may be combined. It should also be noted that reference signs in the claims should not be construed as limiting the scope of the claims.

The invention claimed is:

1. An electronic device for use with a voltage regulator circuit, the device comprising:
   a power supply terminal for connecting to a power supply;
   a first circuit coupled to be powered by the power supply, the first circuit including a contactless communication interface configured to communicate with an external device, the first circuit being susceptible to power supply noise within a predetermined frequency range associated with a communication protocol used by the contactless communication interface; and
   a second circuit coupled to be powered by the power supply, the second circuit including a contact communication interface configured to communicate with another external device, and an open-loop capacitive DC-DC converter configured to provide the contact communication interface with a supply voltage and having a fixed switching frequency that is outside of the predetermined frequency range and is independent of a load current effected by coupling an output voltage from the open-loop capacitive DC-DC converter to an input of the voltage regulator circuit, wherein the open-loop capacitive DC-DC converter is configured to increase an input voltage at the fixed switching frequency and therein mitigating generation of power supply noise in the predetermined frequency range that the first circuit is susceptible to, without feedback provided by a comparator circuit that compares the output voltage of the open-loop capacitive DC-DC converter and a reference voltage.

2. The device according to claim 1, wherein the second circuit further comprises a low-dropout regulator coupled between the power supply terminal and an input of the open-loop capacitive DC-DC converter, and another communication interface configured to communicate with another external device, the open-loop capacitive DC-DC converter being configured to mitigate generation of power supply noise in the predetermined frequency range that the first circuit is susceptible to while the first circuit operates within the predetermined frequency range.

3. The device according to claim 1, wherein the second circuit further includes the voltage regulator circuit configured as a low-dropout regulator configured to receive the output voltage of the open-loop capacitive DC-DC converter.

4. The device according to claim 3, wherein the low-dropout regulator is coupled to provide a contact communication interface of the second circuit with a predetermined supply voltage.

5. The device according to claim 1, further including:
   a first low-dropout regulator arranged between the power supply terminal and an input of the open-loop capacitive DC-DC converter; and
   a second low-dropout regulator configured to receive the output voltage of the open-loop capacitive DC-DC converter and provide the contact communication interface with the supply voltage, wherein the open-loop capacitive DC-DC converter is configured and arranged to provide the contact communication interface with the supply voltage.

6. The device according to claim 1, wherein communication interface of the first circuit comprises a contactless communication interface and wherein the first circuit and the second circuit are integrated on the same chip.

7. The device according to claim 1, wherein the first circuit comprises a low-dropout regulator coupled to the power supply terminal to provide a regulated voltage to a contactless communication interface of the first circuit.

8. The device according to claim 1, wherein the predetermined frequency range is 100 kHz to 1 MHz.

9. The device according to claim 1, wherein the fixed switching frequency of the open-loop capacitive DC-DC converter is larger than 1 MHz.

10. The device according to claim 1, further including at least one reader/writer device adapted to perform contact and/or contactless communication with the electronic device.

11. The device of claim 1, wherein the first circuit is configured and arranged to operate in the predetermined frequency range, and wherein the second circuit is configured and arranged to operate on a switching frequency above the predetermined frequency range while the first circuit operates in the predetermined frequency range.

12. The device of claim 11, wherein the second circuit is configured and arranged to operate independently of the output voltage generated by the second circuit.

13. The device of claim 11, wherein the second circuit is configured and arranged to generate the output voltage that is not used in feedback control of the second circuit.

14. The device of claim 1, wherein the open-loop capacitive DC-DC converter is a DC-DC converter circuit having a capacitor, wherein the DC-DC converter circuit is configured to provide the output voltage at a value that is doubled the input voltage.

15. The device according to claim 1, wherein the contact communication interface comprises a contact-card interface and the communication interface of the first circuit comprises a contactless Near Field Communication (NFC) interface.

16. A method of manufacturing an electronic device for use with a voltage regulator circuit, the method comprising:
   providing a power supply terminal for connecting to a power supply;
   providing a first circuit coupled to be powered by the power supply, the first circuit including a contactless communication interface configured to communicate with an external device, and the first circuit being susceptible to power supply noise within a predetermined frequency range associated with a communication protocol used by the contactless communication interface; and
   providing a second circuit coupled to be powered by the power supply, the second circuit including a contact communication interface configured to communicate with another external device and an open-loop capacitive DC-DC converter configured to provide the contact communication interface with a supply voltage and having a fixed switching frequency outside of the predetermined frequency range and is independent of a load current effected by coupling an output voltage from the open-loop capacitive DC-DC converter to an input of the voltage regulator circuit, wherein the open-loop capacitive DC-DC converter increases an input voltage at the fixed switching frequency and therein mitigates generation of power supply noise in the predetermined frequency range that the first circuit is susceptible to and without feedback provided by a comparator circuit that compares the output voltage of the open-loop capacitive DC-DC converter and a reference voltage.

17. The method of claim 16, wherein
providing the first circuit includes providing a circuit that operates in the predetermined frequency range, and
providing the second circuit includes providing a circuit that operates on a switching frequency above the predetermined frequency range while the first circuit operates in the predetermined frequency range, therein mitigating generation of power supply noise in the predetermined frequency range, and wherein the increase in the input voltage is without feedback provided by a comparator circuit that compares an output of the open-loop DC-DC capacitive converter and a reference voltage.

18. The method of claim 16, wherein providing the second circuit includes providing the open-loop capacitive DC-DC converter as a DC-DC converter circuit having a capacitor wherein the DC-DC converter circuit is configured to provide an output voltage at a value that is doubled the input voltage.

19. The method of claim 16, further including operating the first circuit within the predetermined frequency range while operating the second circuit at a switching frequency that is outside of the predetermined frequency range, wherein the open-loop capacitive DC-DC converter has a fixed switching frequency that is outside of the predetermined frequency range and is independent of a load current of the device.

* * * * *